UNITED STATES PATENT OFFICE 2,653,716

TREATMENT OF FILTERING APPARATUS

Edward J. Corona, Port Allen, La., assignor to Kaiser Aluminum & Chemical Corporation, a corporation of Delaware No Drawing. Application July 8, 1949,
Serial No. 103,739

3 Claims. (Cl. 210—62)

This invention relates to a method of treating filtering apparatus. More particularly the invention relates to a method of cleaning or reconditioning filter cloths which have been used to separate aluminate solution from the insoluble red mud in the recovery of alumina from alumina-containing ores by the well-known wet alkali aluminate method.

In the practice of the wet alkali aluminate method for recovery of alumina from ores containing the same, the caustic digestion of the ore yields a slurry of so-called "red mud," which comprises the insolubles, such as, iron oxide, silica and other impurities, in a sodium aluminate solution. These insolubles are commonly removed from the aluminate solution by means of a thickening operation, and a subsequent final separation involving a filtering operation. In such operation, a press type or rotary type of filtering apparatus is employed provided with a cloth filtering medium, usually made of cotton fabric.

During the filtering operation the cloth gradually becomes plugged or blinded by deposited scale, and the blinding is accelerated and aggravated when the green or pregnant liquor has a high ratio of alumina to caustic. This scale also deposits on the filter leaf frames, spigots and discharge pipes and other internal parts of the filtering apparatus. It has been determined that the scale consists principally of precipitated alumina hydrate, particularly when a relatively low silica aluminous ore is processed.

When the filter cloths or leaves become so impervious due to the deposited alumina hydrate scale that the desired rate of filtration cannot be maintained, the cloths must be removed and discarded. Under present conditions the filter cloths are short lived and such constant replacement of the blinded cloths with new ones is unduly expensive. In addition, the loss of alumina from the plant liquor in the form of scale on the cloths is appreciable.

It is, therefore, highly desirable and a primary object of the invention to substantially reduce the amount of replacement necessary by the use of a cleaning or reconditioning method which effectively extends the useful life of the filter cloths and restores the filtering efficiency thereof to one approaching that of the cloths in their original condition.

A further object is to recover the alumina in the scale deposited on the filter cloths, leaf frames and other internal parts of the filtering apparatus whereby the same may be reintroduced into the plant liquor and thus effectively eliminate any loss of alumina previously occasioned by such deposition.

Another specific object of the invention is to provide a method for reconditioning filter cloths and for cleaning the other internal parts of the filtering apparatus in situ, that is, with the cloths, leaf frames and other parts of the apparatus all in their normal assembled positions in the plant, but merely cut out from the flow of the circulating plant liquor.

It has been discovered that the filtering characteristics of filter cloths used to separate insoluble residues from aluminate solution and blinded by deposit of alumina hydrate scale may be restored by passing a hot aqueous solution of caustic soda through the filter until the scale is substantially dissolved. This treatment effectively dissolves the scale, not only from the filter cloths, but also from the filter leaf frames, spigots, pipes and other interior surfaces of the filters as well.

The caustic soda may be obtained from any source, for example, it may be purchased as pure electrolytic caustic soda. More conveniently, it may be obtained in solution at the alumina plant when outside causticization of soda ash is practiced.

In the preferred embodiment of the invention, the particular filter to be treated is cut out from the flow line of the plant liquor and is connected to a surge-circulating tank containing the caustic soda solution whereby the filter cloths, leaves, spigots and discharge pipes are cleaned by circulating hot caustic solution through the filtering apparatus. The flow of the cleaning solution may be, and preferably is, concurrent, i. e., in the same direction that the plant liquor flows when the filter is in normal use. Countercurrent flow of the caustic solution may be employed, but is not recommended because the pressure of the caustic solution would probably burst the filter cloth. The surge tank may be provided with steam coils for heating the caustic solution to the proper or desired temperature. Alternatively, the caustic solution may be heated before entering the circulating zone by any suitable means.

The caustic solution may be repeatedly circulated through one or more filters until the dissolved alumina in the cleaning solution brings the alumina-to-caustic soda ratio up to about 0.3, which concentration ratio is approximately that of the spent plant liquor following hydrate precipitation from the pregnant liquor. The alumina-enriched caustic solution may then be added to the spent liquor in the plant which is recycled to the ore digestion operation. Substantially all of the alumina deposited as scale is thereby recovered in the form of caustic aluminate solution and is reintroduced into the plant liquor. Thus, the loss of alumina occasioned by such scale deposition is completely eliminated.

Following reconditioning of the filter cloths and cleaning of the other internal parts, the filtering apparatus is reconnected into the flow line for the plant liquor. When the filters, so treated, are put back in service their performance indicates that original filtering efficiency has been restored.

The strength of the caustic cleaning solution may be widely varied, although the caustic concentration must be sufficiently high to dissolve the alumina scale without requiring an excessive volume of solution, or without unduly extending the required time of treatment. The proper range of concentrations of the caustic solution in order to effect a restoration of filtering efficiency within a reasonable time and with a minimum volume of circulating solution will suggest itself to persons skilled in the art, and in all cases will be in excess of the normal caustic concentration in the plant liquor, namely about 150 grams/liter. Relatively dilute concentrations have the advantage of not attacking the cloth as much as concentrated solutions. On the other hand, the more concentrated solutions accomplish the dissolution of the scale rapidly, and being in contact with the cloth for a shorter time and in less volume, any tendency to injure the cloth is minimized.

In addition to the foregoing considerations, the optimum range of caustic solution concentration will vary with the temperature of the solution. At lower temperatures more concentrated solutions are recommended, while more dilute solutions may be employed at higher temperatures. Accordingly, it has been found to be preferable, in general, to employ caustic solutions having a caustic soda concentration in excess of about 150 up to about 250 grams per liter by weight of caustic soda. With a solution having a concentration slightly in excess of the normal caustic concentration in the plant liquor, namely about 150 grams per liter, at the proper temperature, the alumina hydrate scale is dissolved in a satisfactory manner from the filter cloth and the other internal parts of the apparatus. Concentrations substantially above 250 grams per liter may tend to cause undue deterioration when applied to cotton filter cloths and therefore are not recommended. A particularly suitable range giving optimum results is from 175 to 225 grams per liter by weight of caustic.

The temperature of the cleaning solution is preferably maintained from about 175 to about 225° F. depending to some extent on the particular solution concentration utilized, that is, in general lower temperatures for stronger solutions and higher temperatures for less concentrated solutions.

The hot caustic solution is normally circulated through the filter being treated until the increased rate of flow of filtrate indicates the scale has been effectively removed. In most cases this requires from about 45 minutes to an hour. The time of treatment will, of course, vary with solution concentration and temperature.

As an example illustrating a preferred embodiment of the invention, but not to be construed as a limitation thereof, a filter containing blinded cloths and scale deposit on the leaf frames and other internal parts was disconnected from the flow lines of the plant liquor and inserted in the cleaning circuit by connecting the feed and discharge lines thereof to a suitable surge-circulating tank containing hot caustic soda solution maintained at a temperature of about 200° F. and having a caustic concentration of about 225 grams per liter. The solution was continuously passed through the entire filtering apparatus in its normal position in the plant and the flow direction was the same as that of the plant liquor filter feed while the cloth is in normal filtering position. The solution was circulated by means of a pump with an initial pressure of about 40 pounds per square inch guage. After approximately 45 minutes treatment, the increased rate of flow of filtrate at normal filter feed pressure indicated restoration of normal filtering efficiency had been restored.

The filter was then disconnected from the cleaning circuit and reinserted into the plant liquor flow line where it exhibited original filtering efficiency.

The caustic solution employed in the cleaning circuit was reused for the treatment of other filters until the dissolved alumina brought the alumina-to-caustic soda ratio up to about 0.3. The hot solution was then added to the spent liquor from hydrate precipitation and new caustic soda solution was charged into the cleaning circuit.

One of the main advantages flowing from the process of the present invention is that the used cleaning solution does not go to waste, but is completely utilized by incorporating it into the plant liquor, that is, into the spent liquor recycled to the ore digestion operation. A further advantage resides in the fact that the treated filters, including the cloth, need not be washed before reinstating them to plant service, since the cleaning solution is a normal component of the plant liquor. With other cleaning agents heretofore proposed the filters must be thoroughly washed before they are placed back in service in order to avoid contamination of the plant liquor.

Another advantage is that the filters may be treated in situ in the plant in assembled normal use position.

The method of the invention may be applied with equally successful results to filtering apparatus wherein metallic screen is employed as the filtering medium instead of the usual cotton filter cloths.

I claim:

1. A process for restoring the filtering characteristics of filter cloth used to separate the insoluble residues from caustic aluminate solution obtained by digestion of aluminous ores with caustic liquor, and upon which alumina hydrate scale has deposited, which comprises passing a hot solution of caustic soda having a concentration in excess of 150 grams per liter and not substantially in excess of about 250 grams per liter, at a temperature of from about 175 to about 225° F., through the cloth in its position in the filter to dissolve the scale, and thereafter adding the alumina-enriched used caustic soda solution to the spent caustic aluminate plant liquor when the ratio of alumina to caustic soda in the used solution reaches about 0.3.

2. A process of restoring the filtering characteristics of filter cloth which has been used to separate the insoluble residues from caustic aluminate solution, obtained by digestion of aluminous ores with caustic liquor, and upon which alumina hydrate scale has deposited, which comprises circulating hot caustic soda solution through the filter cloth in its normal position in the filter to dissolve the scale, said caustic soda solution having a concentration of from about 175 to about 225 grams per liter by weight of caustic soda, maintaining the circulating solution at a temperature of from about 175 to about 225° F., and thereafter adding the alumina-enriched used caustic soda solution to the spent caustic aluminate plant liquor when the ratio of alumina to caustic soda in the used solution becomes about 0.3.

3. A process for cleaning filtering apparatus and for restoring the filtering characteristics to filter cloth, which has been used to separate the insoluble residues from caustic aluminate solution obtained by digestion of aluminous ores with caustic liquor, and upon which alumina hydrate scale has deposited, which comprises disconnecting the filter containing blinded cloth from the plant liquor flow line, inserting the filter in its assembled normal filtering position into a cleaning solution flow line, circulating a hot aqueous solution of caustic soda through the filter and filter cloths to dissolve the scale, said solution having a caustic soda concentration of from about 175 to 225 grams per liter, maintaining the temperature of the solution at from about 175 to about 225° F., and thereafter adding the alumina-enriched used caustic solution to the spent caustic aluminate plant liquor when the ratio of the alumina to caustic soda in the used solution becomes about 0.3.

EDWARD J. CORONA.

References Cited in the file of this patent

UNITED STATES PATENTS

| Number | Name | Date |
|---|---|---|
| 718,465 | Jewell | Jan. 13, 1903 |
| 1,522,698 | Parsons | Jan. 13, 1925 |
| 1,931,374 | Clark et al. | Oct. 16, 1933 |

FOREIGN PATENTS

| Number | Country | Date |
|---|---|---|
| 5,183 | Great Britain | of 1881 |

OTHER REFERENCES

Water Supply and Sewerage, by Steel, 2nd edition, 1947, pages 259–261, 327 and 328.

Inorganic and Theoretical Chemistry, by Mellor, vol. 5, pages 254 and 255, 1924.

Journal of the New England Water Works Association, March 1937, pages 1–3 and 19.